W. PENDLEY & A. MOSS.
Wheel Plow and Cultivator.
No. 226,674.                    Patented April 20, 1880.
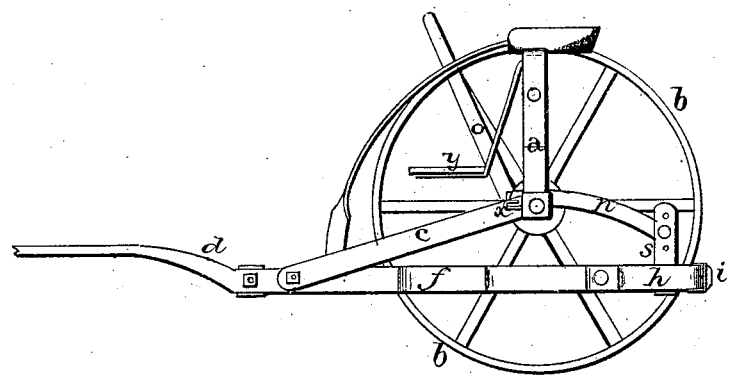
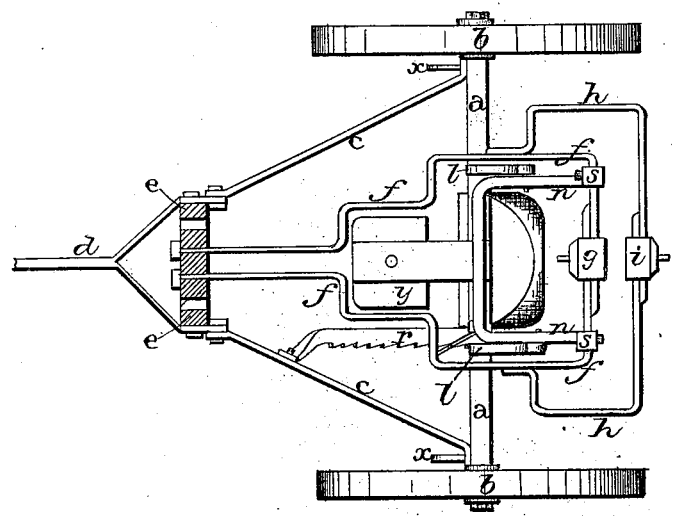
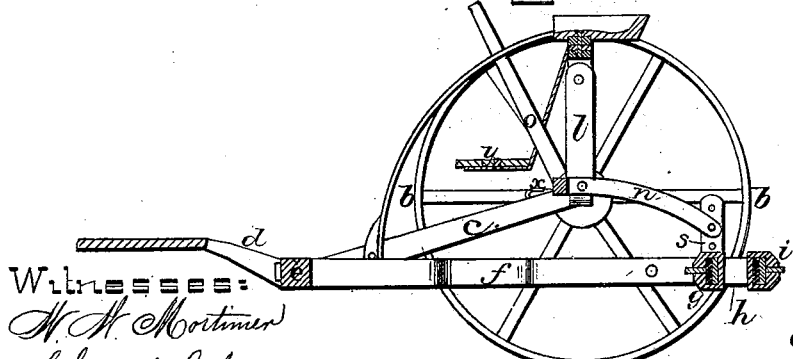
Witnesses:
H. H. Mortimer
Chas. H. Isham
Inventors:
Wm. Pendley,
Anderson Moss,
per
F. A. Lehmann,
Atty.

UNITED STATES PATENT OFFICE.

WILLIAM PENDLEY AND ANDERSON MOSS, OF TALKING ROCK, GEORGIA, ASSIGNORS OF ONE-THIRD OF THEIR RIGHT TO J. E. STEPHENS, OF SAME PLACE.

WHEEL PLOW AND CULTIVATOR.

SPECIFICATION forming part of Letters Patent No. 226,674, dated April 20, 1880.

Application filed February 4, 1880.

*To all whom it may concern:*

Be it known that we, WILLIAM PENDLEY and ANDERSON MOSS, of Talking Rock, in the county of Pickens and State of Georgia, have invented certain new and useful Improvements in Wheel Plows and Cultivators; and we do hereby declare the following to be a full, clear, and exact description of the invention, such as will enable others skilled in the art to which it pertains to make and use it, reference being had to the accompanying drawings, which form part of this specification.

Our invention relates to an improvement in wheel plows and cultivators; and it consists in the arrangement and combination of parts whereby the frame can be expanded and contracted laterally, according to the width desired between the cultivators, and raised and lowered, as will be more fully described hereinafter.

Figure 1 is a side elevation of our invention. Fig. 2 is an inverted section, and Fig. 3 is a vertical longitudinal section.

$a$ represents the axle, which is raised upward at the center, as shown, and which has a driving-wheel, $b$, on each end. Secured to the front side of this axle, just inside of each wheel, is the flat bar $c$, which extends obliquely forward, and has its front end bolted to one of the rear prongs of the tongue $d$. This tongue has secured between the two prongs on its rear end the block $e$, which has a groove cut in each end to receive the prong, and then a bolt is passed through into the block, so as to keep the block in place. Through this block $e$ are made a number of holes, into which the front ends of the parts of the frame $f$ are thrust, and then secured in place by means of nuts. This frame is of the shape shown, extends back a suitable distance beyond and below the axle, and has its two ends fastened together by means of the block $g$ and set-screw. Also secured to the rear end of this frame $f$ is a frame, $h$, which has its ends fastened together by a similar block, $i$, and set-screw.

If the front ends of the two parts of the frame are moved outward from each other and placed in the holes in the outer ends of the block $e$, and the set-screws are loosened in the blocks $g$ $i$, the frames $f$ $h$ are widened laterally, so as to increase the distance between the cultivators, and by contracting the frame the cultivators are brought closer together.

Upon the rear part of the frame $f$ are fastened, by means of set-screws, the movable perforated standards, which are intended to always remain the same distance apart.

In widening and narrowing the frame the set-screws are loosened, and then the parts of the frame move through the standard. Fastened to these standards is the U-shaped frame, which is pivoted in the two hangers $l$, which hangers are pivoted at their upper ends inside of the raised part of the axle. To this frame $n$ is fastened the lower end of the lever $o$, which engages with the rack $r$, and by means of which lever the frames $f$ $h$ are raised and lowered at the will of the operator. The distance the frames $f$ $h$ are raised and lowered is regulated by the holes in the standards $s$. As the front end of the frame $f$ is secured in the block $e$, and at its rear end to the frame $n$, when the lever $o$ is moved the tongue and frame are both lowered.

To the front side of the axle are secured the two hooks $x$, in which the stay-chains are fastened. To the under side of the axle, just below the seat, is secured the foot-step $y$.

As the machine is being driven across the field the rider can regulate the depth the plows shall run according to the ground without getting off his seat or stopping the team.

Having thus described our invention, we claim—

The combination of the frame $f$ with the standards $s$, U-shaped frame $n$, hangers $l$, lever $o$, and rack $r$, substantially as described.

In testimony that we claim the foregoing we have hereunto set our hands this 21st day of January, 1880.

WILLIAM PENDLEY.
ANDERSON MOSS.

Witnesses:
WILLIAM I. SHARPER,
JOHN W. ROE.